UNITED STATES PATENT OFFICE 2,670,345

SUBSTITUTED GLUCONAMIDES

Charles L. Mehltretter, Russell L. Mellies, and John C. Rankin, Peoria, Ill., assignors to the United States of America as represented by the Secretary of Agriculture No Drawing. Application April 5, 1949,
Serial No. 85,711

7 Claims. (Cl. 260—98)

(Granted under Title 35, U. S. Code (1952), sec. 266)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to a new class of chemical compounds useful as wetting agents and textile assistants. More particularly, the invention relates to the preparation of a new class of sulfuric acid derivatives of substituted gluconamides and their corresponding alkali metal salts.

The compounds of this invention especially in the form of their alkali metal salts are water soluble and possess the advantageous property of reducing the surface tension of water and other aqueous solutions to a remarkable degree.

The substituted gluconamides employed in our invention may be represented by the following general formula: $RNHCO(CHOH)_4CH_2OH$ in which the radical R is a saturated or unsaturated straight or branch chain aliphatic hydrocarbon radical of from eight to eighteen carbon atoms and in which R may also be a rosin residue. They may be prepared by reaction between D-gluconolactone and the requisite primary amine.

The primary amines include straight and branch-chain aliphatic, either saturated or unsaturated. They also include the so-called rosin amines, such as dehydroabietylamine,

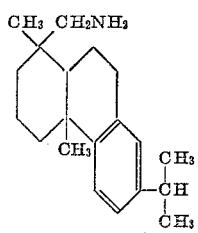

dihydroabietylamine, tetrahydroabietylamine, dextropimarylamine, and the like. Mixtures of these or the individual constituents may be employed. In the specific examples given below, the rosin amine employed was a commercial product, Rosin Amine D, having a molecular weight of the range of 332.5 to 338.5.

The hydroxyl groups of these substituted gluconamides are transformed to sulfuric ester groups by reaction with a sulfating agent, such as chlorosulfonic acid or the like as illustrated by the following equation:

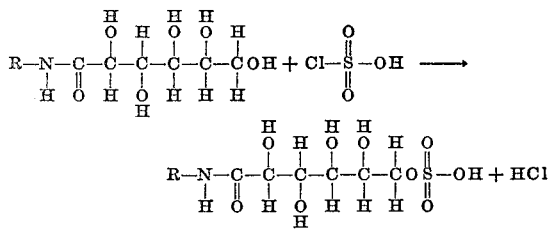

The corresponding alkali metal salts of these compounds are simply obtained by neutralization of the sulfuric esters with an alkali metal base. The number of hydroxyl groups so transformed may vary from one to three or more, depending upon the molecular ratio of sulfating agent employed. The following specific examples illustrate the invention.

EXAMPLE 1

*Preparation of N-2-ethylhexyl-D-gluconamide*

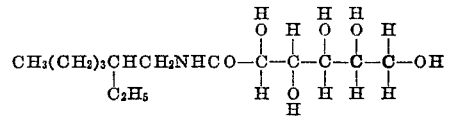

A solution was prepared consisting of 23.2 g. of 2-ethylhexylamine in 250 ml. of methanol. This solution was placed on a steam bath and 32 g. of D-gluconolactone was added portion-wise over a 15-minute period. The mixture was refluxed for 15 minutes and then cooled. The white product which crystallized was removed by filtration, washed with cold ethanol and dried at 60° C. A first crop of 27.9 g. was obtained, M. P. 116–118° C. Two more crops totalling 24.6 g. were isolated from the mother liquor, giving a total yield of crude product of 95 percent of theory.

After recrystallization from ethanol the N-2-ethylhexyl-D-gluconamide melted at 117–118° C.

*Analysis.*—Calc'd. for: $C_{14}H_{29}O_6N$: N, 4.5 percent. Found: N, 4.5 percent.

In a similar manner additional substituted gluconamides were prepared. The data obtained are summarized in the following table.

TABLE I

| Example No. | Gluconamide | Percent Yield | M. P., ° C. | Percent nitrogen | |
|---|---|---|---|---|---|
| | | | | Found | Theory |
| 2 | octyl | 95.5 | 156–157 | 4.4 | 4.6 |
| 3 | decyl | 90 | 153–154 | 4.2 | 4.2 |
| 4 | dodecyl | 94.5 | 152–154 | 3.8 | 3.9 |
| 5 | tetradecyl | 83 | 153–154 | 3.6 | 3.6 |
| 6 | octadecadienyl | 86 | 145–146 | 3.1 | 3.2 |
| 7 | rosin | 89 | 141–142 | 3.0 | 2.7 |

The sulfated D-gluconamides of this invention and the corresponding sodium salts were prepared as illustrated in the following examples.

EXAMPLE 8
*Preparation of sodium N-2-ethylhexyl-D-gluconamide sulfate*

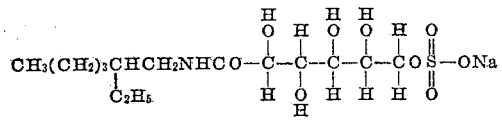

A suspension was prepared consisting of 18.4 g. of N-2-ethylhexyl-D-gluconamide in 200 ml. of dry methylene chloride. To this suspension was added portion-wise a solution of 7.0 g. of chlorosulfonic acid dissolved in 20 ml. of methylene chloride. During the addition, the reaction mixture was stirred and maintained under gentle reflux. Stirring and refluxing was continued for 4 hours after the addition was completed. Methylene chloride and hydrogen chloride were removed from the reaction mixture by a stream of dry air, leaving a white residue of N-2-ethylhexyl-D-gluconamide sulfuric ester. This was dissolved in 50 percent ethanol and neutralized to pH 7.1 with sodium hydroxide solution. The neutral solution was concentrated in vacuo to dryness. The residue was extracted with acetone and the residual dry white salt weighed 23.1 g., a yield of 94 percent of theory.

*Analysis.*—Calc'd. for: $C_{14}H_{28}O_9SNNa$: N, 3.4. Found: N, 3.3.

EXAMPLE 9
*Preparation of sodium N-dodecyl-D-gluconamide sulfate*

The procedure of Example 8 was followed in reacting 25.4 g. of N-dodecyl-D-gluconamide with 12.2 g. of chlorosulfonic acid. N-dodecyl-D-gluconamide sulfuric ester was recovered as in the above Example 8, dissolved in 150 ml. of water and neutralized to pH 7.1 with sodium hydroxide solution. The neutral solution was concentrated in vacuo to a white product weighing 36.1 g. (theory 36.2 g.).

*Analysis.*—Calc'd.: N, 2.7; S, 9.1. Found: N, 2.7; S, 9.2.

In Example 8, above, the substituted gluconamide was reacted with a molecular equivalent of chlorosulfonic acid, whereas, in Example 9 1.5 molecular equivalents of chlorosulfonic acid was used. We have discovered that some members of the series of new compounds of our invention, particularly those in which the R represents a radical of more than 8 carbon atoms, which contain only one sulfate group per molecule, are not completely soluble in water in 1 percent concentration. According to our process, the degree of sulfation may be varied to increase the molecular ratio up to 3:1 and higher. This may be accomplished simply by employing the requisite proportion of sulfating agent. A series of experiments was performed in which R radicals and molecular ratios were varied. The results are summarized in Table II.

| Example No. | Gluconamide Sulfate | Percent Yield | Percent Nitrogen | | Percent Sulfur | | Mole SO₃Na per Molecule |
|---|---|---|---|---|---|---|---|
| | | | Found | Theory | Found | Theory | |
| 10 | decyl | 92 | 3.2 | 3.2 | 7.0 | 7.3 | 1. |
| 11 | dodecyl | 94 | 2.7 | 3.0 | 7.1 | 6.9 | 1. |
| 12 | do | 98 | 2.7 | 2.7 | 9.2 | 9.1 | 1.50 |
| 13 | tetradecyl | 94 | 2.8 | 2.8 | 6.5 | 6.5 | 1. |
| 14 | do | 95 | 2.6 | 2.6 | 8.7 | 8.6 | 1.50 |
| 15 | do | 92 | 2.3 | 2.4 | 10.2 | 10.8 | 2. |
| 16 | octadecadienyl | 98 | 2.5 | 2.6 | 6.1 | 5.9 | 1. |
| 17 | rosin | 95 | 2.2 | 2.1 | 6.8 | 7.3 | 1.53 |
| 18 | do | 92 | 2.0 | 2.0 | 8.4 | 8.9 | 2. |
| 19 | do | 93 | 1.8 | 1.7 | 10.9 | 11.7 | 3. |

The above examples are not to be construed as as limitative. Calcium, magnesium, iron, chromium, aluminum, nickel, ammonium, and substituted ammonium salts, and pyridinium, quinolinium, and others are prepared from the sulfuric acid by precipitation with the corresponding base, or from the sodium compound by metathesis with the corresponding salt of the metal, ammonia, or amine. Other cycloaliphatic, hydroaromatic, and cycloaliphatic substituted alkyl amines are obviously substitutable for the amines listed above, such as c-alkyl substituted cyclopentadienyl amines and cyclopentylamines, and cyclohexylalkylamines, alkyl-cyclohexenylamine, cyclohexenylalkylamines, and cyclohexadienylamines. Amines having more than 18, for example, up to about 32 or more carbon atoms are also within the scope of this disclosure.

Having thus described our invention, we claim:

1. A gluconamide compound of the formula:

$$RNHCO(CHOH)_4CH_2OH$$

in which R is a hydrocarbon radical taken from the group consisting of alkyl radicals having from 8 to 18 carbon atoms and rosin radicals, and in which at least one hydroxyl group of the gluconyl radical is replaced by the radical $SO_4M$ in which M is taken from the group consisting of hydrogen and alkali metals.

2. Sodium N-2-ethylhexyl-D-gluconamide sulfate.
3. Sodium N-dodecyl-D-gluconamide sulfate.
4. Sodium N-rosin-D-gluconamide sulfate.
5. A compound of the formula $$RNHCO(CHOH)_4CH_2OSO_3M$$

in which M is a cation and R is an aliphatic hydrocarbon radical having at least 8 carbon atoms.

6. A gluconamide compound of the formula:

RNHCO(CHOH)$_4$CH$_2$OH in which RNH is the radical of a rosin amine, and in which at least one hydroxyl group of the gluconyl radical is replaced by the radical —SO$_4$M in which M is an alkali metal radical.

7. A gluconamide compound of the formula:

RNHCO(CHOH)$_4$CH$_2$OH in which formula R is an alkyl radical having not less than eight carbon atoms and having a straight and open chain of at least six carbon atoms, and in which formula at least one hydroxyl group of the gluconyl radical is replaced by the radical —SO$_4$M in which M is an alkali metal radical.

CHARLES L. MEHLTRETTER.
RUSSELL L. MELLIES.
JOHN C. RANKIN.

References Cited in the file of this patent

UNITED STATES PATENTS

| Number | Name | Date |
|---|---|---|
| 2,216,617 | Katz | Oct. 1, 1940 |
| 2,267,609 | Kern | Dec. 23, 1941 |

OTHER REFERENCES

Goldner et al., J. Am. Pharm. Assoc., vol. 28, pp. 364–369 (1939).

J. A. C. S., vol. 66, pp. 1516–1520 (1944).